United States Patent [19]

Cox et al.

[11] Patent Number: 4,966,959

[45] Date of Patent: Oct. 30, 1990

[54] COPOLYESTERS AND FORMULATIONS THEREOF FOR ADHESIVES

[75] Inventors: Abraham J. Cox; Max F. Meyer, Jr., both of Kingsport, Tenn.

[73] Assignee: Eastern Kodak Company

[21] Appl. No.: 334,429

[22] Filed: Apr. 7, 1989

[51] Int. Cl.⁵ .............................................. C08G 63/02
[52] U.S. Cl. ................................. 528/272; 528/295.5; 528/302; 528/307; 528/308.6; 525/437; 525/444
[58] Field of Search ..................... 528/272, 295.5, 302, 528/307, 308.6; 525/437, 444

[56] References Cited

U.S. PATENT DOCUMENTS

| | | | |
|---|---|---|---|
| 4,094,721 | 6/1978 | Sturm et al. | 156/309 |
| 4,299,934 | 11/1981 | Petke et al. | 525/173 |
| 4,419,507 | 12/1983 | Sublett | 528/302 |
| 4,576,997 | 3/1986 | Trotter et al. | 525/444 |
| 4,618,643 | 10/1986 | von Voithenberg et al. | 524/430 |

FOREIGN PATENT DOCUMENTS 1402648 8/1975 United Kingdom .

Primary Examiner—John Kight, III
Assistant Examiner—Sam A. Acquah

[57] ABSTRACT

Disclosed are certain copolyesters comprising an acid component of (1) 60 to 75 mol % of terephthalic acid, and (2) 25 to 40 mol % of a dicarboxylic acid, and a glycol component of (1) 55 to 65 mol % 1,4-butanediol, and (2) 35 to 45 mol % one or more other aliphatic diols. The copolyester or formulation thereof with a tackifying resin has excellent properties for use as a glue gun adhesive.

20 Claims, No Drawings

COPOLYESTERS AND FORMULATIONS THEREOF FOR ADHESIVES

FIELD OF THE INVENTION

The present invention is directed to certain copolyesters containing repeating units of terephthalic acid and 1,4-butanediol that are useful as adhesives especially as hot-melt glue gun adhesives.

BACKGROUND OF THE INVENTION

Certain polyesters are known in the art to be useful in adhesive applications; however, these adhesives suffer several disadvantages (see, for example, U.S. Pat. No. 4,618,643).

Polyester adhesives are normally used in powder, film, or web form for bonding and laminating applications. They can be processed easily in extruders where temperatures can be raised to obtain the lower melt viscosities needed for the application. With certain hot-melt adhesive application systems such as hand-held glue guns, it is not practical or safe to use processing temperatures greater than 190° C. or adhesives with melt viscosity values greater than about 50,000 centipoise (cP) at 190° C. for preparing bonds. Most polyester adhesives have melt viscosity values in the range of about 75,000 to about 300,000 cP at 190° C. and are not suitable for these applications. In general, if the inherent viscosity (I.V.) of polyesters is reduced to levels so that the melt viscosity at application temperature is less than about 50,000 cP, the bonding properties of the polyester adhesive for hot-melt applications are often reduced to an unacceptable level due to faster crystallization times and shorter open time of the adhesive and the reduced tensile strength of the bulk polymer.

It would be desirable to have a polyester or formulation thereof that has excellent bonding properties and acceptable melt viscosity for glue gun adhesive applications.

SUMMARY OF THE INVENTION

The present invention is directed to a copolyester comprising (A) an acid component comprising repeating units of
  (1) 60 to 75 mol % of terephthalic acid, and
  (2) 25 to 40 mol % of a dicarboxylic aliphatic or cycloaliphatic acid having from 4 to 20 carbon atoms, and (B) a glycol component comprising repeating units of
  (1) 55 to 65 mol % 1,4-butanediol, and
  (2) 35 to 45 mol % of one or more other aliphatic diols having 2 to 12 carbon atoms, wherein the total mol % of acid component and glycol component are each 100 mol %; the inherent viscosity of the copolyester is about 0.4 to about 0.6 determined at 25° C. in 60/40 (wt./wt.) phenol/tetrachloroethane at a concentration of 0.5 gram/100 ml; and said copolyester has a heat of fusion value of less than about 20 calories per gram.

The present invention is also directed to a hot-melt adhesive blend for use with a glue gun comprising (I) greater than about 70 weight % of a copolyester comprising
  (A) an acid component comprising repeating units of
    (1) 60 to 75 mol % of terephthalic acid, and
    (2) 25 to 40 mol % of a dicarboxylic aliphatic or cycloaliphatic acids having from 4 to 20 carbon atoms, and
  (B) a glycol component comprising repeating units of
    (1) 55 to 65 mol % 1,4-butanediol, and
    (2) 35 to 45 mol % of one or more other aliphatic diols having 2 to 12 carbon atoms,
  wherein the total mol % of acid component and glycol component are each 100 mol %; the inherent viscosity of the copolyester is about 0.4 to about 0.6 determined at 25° C. in 60/40 (wt./wt.) phenol/tetrachloroethane at a concentration of 0.5 gram/100 ml; and a heat of fusion value of less than about 20 calories per gram, and (II) greater than 0 but less than about 30 weight % of a tackifying resin, wherein the melt viscosity of the blend is about 10,000 to about 50,000 cP at application temperature.

DETAILED DESCRIPTION OF THE INVENTION

It is an advantage of the present invention that the copolyesters can be used alone as a glue gun adhesive or can be formulated with a tackifying resin, without the need for a plasticizer. However, plasticizers as well as other additives such as colorants, i.e., dyes or pigments, can be used in the adhesives of the present invention up to about the 3% level, preferably up to about 1%, based on the weight of the total adhesive composition. Minor quantities of fillers may be included to serve as nucleating promotor and are desirable in those cases where a more rapid build up of crystallinity is desired. For this purpose it is preferred to employ up to about 1% by weight of the composition of an inert filler for example polyethylene or more preferably an inorganic material for example titanium oxide or calcium carbonate.

The copolyesters of the present invention can be made using typical polycondensation techniques well known in the art (see, for example U.S. Pat. Nos. 4,094,721 and 4,419,507, incorporated herein by reference in their entirety).

In order to minimize thermal degradation and hydrolytic reactions of polyesters catalyzed by carboxylic acids during production, or use of the glue stick in a glue gun, it is preferred to ensure that the acid number of the copolyester is kept as low as possible, for example less than about 3 mg KOH/g polyester. In addition, it is preferred to employ an antioxidant, for example an ester of phosphoric acid in order to enhance stability at high temperatures, e.g., up to about 240° C.

It is preferred that the inherent viscosity (I.V.) of the copolyester of the present invention is about 0.5 to about 0.55. It is also preferred that the melting points (Tm) of the copolyesters of the present invention are less than about 140° C., more preferred are about 90° C. to about 140° C., most preferred are about 100° C. to about 130° C. Tm typically can be measured by differential scanning calorimetry (DSC).

It is preferred that the aliphatic diol of component (B)(2) has 2 to 10 carbon atoms and the most preferred diol is diethylene glycol.

It is preferred that the copolyester of the present invention is in the form of a hot-melt adhesive useful with a glue gun, wherein said polyester has a melt viscosity value of about 10,000 to about 50,000 centipoise (cP) at application temperature (e.g., 190° C. or greater), more preferred is about 20,000 to about 40,000 cP.

It is preferred that component (A)(2) of the copolyester is glutaric acid, sebacic acid, adipic acid, azelaic acid, or the like.

Other preferred embodiments of the copolyester of the present invention are wherein:

component (A)(1) is 75 to about 60 mol % terephthalic acid, component (A)(2) is 25 to about 40 mol % glutaric acid, component (B)(1) is about 60 to about 65 mol % 1,4-butanediol, and component (B)(2) is about 35 to about 40 mol % diethylene glycol;

component (A)(1) is about 74 mol % terephthalic acid, component (A)(2) is about 26 mol % glutaric acid, component (B)(1) is about 58 mol % 1,4-butanediol, and component (B)(2) is about 42 mol % diethylene glycol;

component (A)(1) is 75 mol % terephthalic acid, component (A)(2) is 25 mol % glutaric acid, component (B)(1) is about 65 mol % 1,4-butanediol, and component (B)(2) is about 35 mol % diethylene glycol; or component (A)(1) is about 60 mol % terephthalic acid, component (A)(2) is about 40 mol % glutaric acid, component (B)(1) is about 58 mol % 1,4-butanediol, and component (B)(2) is about 42 mol % diethylene glycol.

The blends of the present invention can be prepared using blending techniques well known in the art, for example by processing in an extruder followed by well-known standard pelletization processes, or the blends may be extruded into rods or cast into a tubular mold specified to size to be fed to hand-held, hot-melt glue guns (see, for example, U.S. Pat. No. 4,618,643, incorporated herein by reference in its entirety). The glue sticks may be aged in the mold overnight until they have developed at least some crystallinity before using them.

Also, in the blend of the present invention it is preferred that component (I) is present in an amount of about 80–95 weight % and component (II) is present in an amount of about 5–20 weight %.

The tackifying resin (component (II)) of the blend of the present invention can be any such resin commonly used to tackify polyester-based adhesives. Such resins can be liquid or solid but solid is preferred. The tackifying resins useful in the adhesive compositions of this invention can be hydrogenated rosin or rosin esters and the like. Suitable tackifying rosin esters are those which include ethylene glycol, polyethylene glycol, glycerol and pentaerythritol rosin esters, hydrogenated rosin esters or methylated rosin esters. For example, commercially available materials include "Staybelite" Ester 3, triethylene glycol ester of hydrogenated rosin, and "Foral" 85 and 105, highly stabilized ester resins of pentaerythritol and rosin base.

The hydrogenated rosins and rosin esters can be used either alone or in combinations. These tackifying resins preferably have softening points of at least 100° C. and most preferably at least 120° C.

Preferred tackifying resins include hydrogenated rosin, a rosin ester, or a mixture thereof. The most preferred tackifying resin is a pentaerythritol ester of hydrogenated rosin.

The adhesives of the present invention have good to excellent bonding and processing characteristics.

More specifically, it is preferred that the adhesives of the present invention have a lap-shear strength of greater than about 300 pounds per square inch (psi), more preferably greater than about 400 psi when applied as an adhesive to oak or pine. Lap-shear strength can be measured by an Instron machine using 0.05–0.5 in/min crosshead speed at 23° C. after the bonds have been aged at least 24 hours.

The following examples illustrate the present invention but should not be interpreted as a limitation thereon.

EXAMPLE 1 (Comparative)

A copolyester [poly(tetramethylene terephthalate) modified with 27 mol % glutaric acid and 42 mol % diethylene glycol; Tm 115° C.; I.V. 0.83, melt viscosity 300,000 cP at 190° C. (measured on a Brookfield Thermosel Viscometer)] is molded into about ½ inch diameter by about 3 inch long rod at about 150° C. The rod is fed into a hot-melt glue gun with a trigger feed like that made by Loctite Corporation. The rod will melt in the heating chamber where a temperature of about 150° C. is reached, but the molten adhesive is very slow to feed from the applicator nozzle of the gun, and the rod will not continuously feed into the heating chamber with the gun trigger. The polymer is so viscous that an adequate amount of adhesive cannot be applied to the substrate to be bonded. This example demonstrates that samples with melt viscosities as high as 300,000 cP at 190° C. will not apply properly from this type of hot-melt gun. An attempt is made to make bonds with similar copolyester adhesive [poly(tetramethylene terephthalate) modified with 26 mol % glutaric acid and 40 mol % diethylene glycol; Tm 120° C.; I.V. 0.75, melt viscosity 150,000 cP at 190° C. (measured on a Brookfield Thermosel Viscometer)] by feeding pellets into the heating chamber of the gun. The melt viscosity is so high that an adequate amount of adhesive cannot be applied before the adhesive cools and becomes too viscous to make a bond.

EXAMPLE 2

A copolyester adhesive [poly(tetramethylene terephthalate) modified with 26 mol % glutaric acid and 42 mol % diethylene glycol; Tm 115° C.; I.V. 0.60, melt viscosity 37,000 cP at 190° C. (measured on a Brookfield Thermosel Viscometer)] is used to prepare bonds with pine substrate in a manner as given in Example 1.

Molten adhesive is applied from the applicator onto a 1 in.×3 in.×0.25 in. pine bar, and another pine bar is placed on the adhesive coated bar to give a 1-in.$^2$ lap-shear bond. Three bonded samples are prepared in this manner. The bonds are allowed to age at room temperature for at least 24 hours before testing. The three bonded samples are tested for bond strength by pulling them apart using an Instron machine and a crosshead speed of 0.5 in./minute. The pine bonds have an average lap-shear strength of 420 psi. This example illustrates that selected polyester adhesives with relatively low I.V. values and low melt viscosities can be used to prepare adequate bonds using this type of hot-melt gun.

Similarly good results are achieved when the polyester of this example is used to bond oak substrate. Similarly good results are achieved when the polyester of this example is melt blended with 10% of a pentaerythritol ester of hydrogenated rosin.

EXAMPLE 3 (Comparative)

A copolyester adhesive [poly(tetramethylene terephthalate) modified with 12 mol % isophthalic acid and 20 mol % sebacic acid; Tm 175° C.; I.V. 0.38; melt viscosity 5,000 cP at 190° C. (measured on a Brookfield Thermosel Viscometer)] is used to prepare bonds with pine substrate at 190° C. in a manner similar to that given in Example 1. The molten adhesive turns an opaque color in less than ten seconds after it is applied from the hot-melt applicator to the pine. The bonded samples delaminate very readily when bent by hand after two hours and after over 24 hours of aging at ambient conditions, indicating very weak lap-shear strength. This example demonstrates that polyester adhesives with low I.V. and low melt viscosity values that crystallize rapidly will not give bonds with sufficient strength when applied from the type of hot-melt gun as described in Example 1.

EXAMPLE 4

A copolyester adhesive [poly(tetramethylene terephthalate) modified with 25 mol % glutaric acid and 35 mol % diethylene glycol; Tm 129° C.; I.V. 0.57; melt viscosity 35,000 cP at 190° C.] is used to prepare bonds with pine substrate in a manner given in Example 2. The bonds have an average lap-shear strength of 410 psi.

Similarly good results are achieved when the polyester of this example is melt blended with 10% of a pentaerythritol ester of hydrogenated rosin.

EXAMPLE 5

A copolyester adhesive [poly(tetramethylene terephthalate) modified with 40 mol % glutaric acid and 42 mol % diethylene glycol; Tm 90°-100° C. if detectable; I.V. 0.60; melt viscosity of 36,000 cP at 190° C.] is used to prepare bonds with pine substrate in a manner given in Example 2. The bonds have an average lap-shear strength of 425 psi.

Similarly good results are achieved when the polyester of this example is melt blended with 5% of a pentaerythritol ester of hydrogenated rosin.

The invention has been described in detail with particular reference to preferred embodiments thereof, but it will be understood that variations and modifications can be effected within the spirit and scope of the invention.

What is claimed is:

1. A copolyester comprising
   (A) an acid component comprising repeating units of
      (1) 60 to 75 mol % of terephthalic acid, and
      (2) 25 to 40 mol % of a dicarboxylic aliphatic or cycloaliphatic acid having from 4 to 20 carbon atoms, and
   (B) a glycol component comprising repeating units of
      (1) 55 to 65 mol % 1,4-butanediol, and
      (2) 35 to 45 mol % of one or more other aliphatic diols having 2 to 12 carbon atoms,
   wherein the total mol % of acid component and glycol component are each 100 mol %; the inherent viscosity of the copolyester is about 0.4 to about 0.6 determined at 25° C. in 60/40 (wt./wt.) phenol/tetrachloroethane at a concentration of 0.5 gram/100 ml; and said copolyester has a heat of fusion value of less than about 20 calories per gram.

2. The copolyester of claim 1 wherein said inherent viscosity is about 0.4 to about 0.55.

3. The copolyester of claim 1 wherein the aliphatic diol of component (B)(2) has 2 to 12 carbon atoms.

4. The copolyester of claim 1 wherein component (B)(2) is diethylene glycol.

5. The copolyester of claim 1 wherein component (A)(2) is glutaric acid, sebacic acid, adipic acid, or azelaic acid.

6. The copolyester of claim 1 wherein component (A)(1) is 75 to about 60 mol % terephthalic acid, component (A)(2) is 25 to about 40 mol % glutaric acid, component (B)(1) is about 60 to about 65 mol % 1,4-butanediol, and component (B)(2) is about 35 to about 40 mol % diethylene glycol.

7. The copolyester of claim 1 wherein component (A)(1) is about 74 mol % terephthalic acid, component (A)(2) is about 26 mol % glutaric acid, component (B)(1) is about 58 mol % 1,4-butanediol, and component (B)(2) is about 42 mol % diethylene glycol.

8. The copolyester of claim 1 wherein component (A)(1) is 75 mol % terephthalic acid, component (A)(2) is 25 mol % glutaric acid, component (B)(1) is about 65 mol % 1,4-butanediol, and component (B)(2) is about 35 mol % diethylene glycol.

9. The copolyester of claim 1 wherein component (A)(1) is about 60 mol % terephthalic acid, component (A)(2) is about 40 mol % glutaric acid, component (B)(1) is about 58 mol % 1,4-butanediol, and component (B)(2) is about 42 mol % diethylene glycol.

10. The copolyester of claim 1 in the form of a hot-melt adhesive useful with a glue gun, wherein said polyester has a melt viscosity value of about 10,000 to about 50,000 cP at application temperature.

11. The copolyester of claim 10 wherein said melt viscosity is about 20,000 to about 40,000 cP at application temperature.

12. A hot-melt adhesive blend for use with a glue gun comprising
   (I) greater than about 70 weight % of a copolyester comprising
      (A) an acid component comprising repeating units of
         (1) 60 to 75 mol % of terephthalic acid, and
         (2) 25 to 40 mol % of a dicarboxylic aliphatic or cycloaliphatic acid having from 4 to 20 carbon atoms, and
      (B) a glycol component comprising repeating units of
         (1) 55 to 65 mol % 1,4-butanediol, and
         (2) 35 to 45 mol % of one or more other aliphatic diols having 2 to 12 carbon atoms,
      wherein the total mol % of acid component and glycol component are each 100 mol %; the inherent viscosity of the copolyester is about 0.4 to about 0.6 determined at 25° C. in 60/40 (wt./wt.) phenol/tetrachloroethane at a concentration of 0.5 gram/100 ml; and a heat of fusion value of less than about 20 calories per gram, and
   (II) greater than 0 but less than about 30 weight % of a tackifying resin,
   wherein the melt viscosity of the blend is about 10,000 to about 50,000 cP at application temperature.

13. The blend of claim 12 wherein the inherent viscosity of said copolyester is about 0.4 to about 0.55, and said blend has a melt viscosity at application temperature of about 20,000 to about 40,000 cP.

14. The blend of claim 12 wherein component (I) is present in an amount of about 80-95 weight % and component (II) is present in an amount of about 5-20 weight %.

15. The blend of claim 12 wherein component II is hydrogenated rosin, a rosin ester, or a mixture thereof.

16. The blend of claim 12 wherein component (I)-(A)(2) is glutaric acid, sebacic acid, adipic acid, or azelaic acid, and component (I)(B)(2) is diethylene glycol.

17. The blend of claim 12 wherein component (I)-(A)(1) is 75 to about 60 mol % terephthalic acid, component (I)(A)(2) is 25 to about 40 mol % glutaric acid, component (I)(B)(1) is about 60-65 mol % 1,4-butanediol, and component (I)(B)(2) is about 35-40 mol % diethylene glycol.

18. The blend of claim 12 wherein component (I)-(A)(1) is about 74 mol % terephthalic acid, component (I)(A)(2) is about 26 mol % glutaric acid, component (I)(B)(1) is about 58 mol % 1,4-butanediol, and component (I)(B)(2) is about 42 mol % diethylene glycol.

19. The blend of claim 12 wherein component (I)-(A)(1) is 75 mol % terephthalic acid, component (I)-(A)(2) is 25 mol % glutaric acid, component (I)(B)(1) is about 65 mol % 1,4-butanediol, and component (I)(B)(2) is about 35 mol % diethylene glycol.

20. The blend of claim 12 wherein component (I)-(A)(1) is about 60 mol % terephthalic acid, component (I)(A)(2) is about 40 mol % glutaric acid, component (I)(B)(1) is about 58 mol % 1,4-butanediol, and component (I)(B)(2) is about 42 mol % diethylene glycol.

* * * * *